United States Patent [19]

Fujiwara et al.

[11] Patent Number: 5,548,652
[45] Date of Patent: Aug. 20, 1996

[54] SILENCING APPARATUS

[75] Inventors: Susumu Fujiwara; Masahiko Sakata; Mikio Ishizuka, all of Kanagawa-ken, Japan

[73] Assignee: Mitsubishi Denki Kaibushiki Kaisha, Tokyo, Japan

[21] Appl. No.: 974,976

[22] Filed: Nov. 12, 1992

[30] Foreign Application Priority Data

Mar. 11, 1992 [JP] Japan .................................. 4-052710

[51] Int. Cl.⁶ .......................... A61F 11/06; H03B 29/00
[52] U.S. Cl. .............................................. 381/71; 381/86
[58] Field of Search ................................ 381/71, 94, 86

[56] References Cited

U.S. PATENT DOCUMENTS

| | | | |
|---|---|---|---|
| 4,506,380 | 3/1985 | Matsui | 381/86 |
| 4,878,188 | 10/1989 | Ziegler, Jr. | 381/71 |
| 4,977,600 | 12/1990 | Ziegler . | |
| 5,022,082 | 6/1991 | Eriksson et al. | 381/71 |
| 5,029,218 | 7/1991 | Nagayasu | 381/71 |
| 5,125,241 | 6/1992 | Nakanishi et al. | 381/71 |
| 5,170,433 | 12/1992 | Elliott et al. | 381/71 |
| 5,251,262 | 10/1993 | Suzuki et al. | 381/71 |
| 5,267,320 | 11/1993 | Fukumizu | 381/71 |

FOREIGN PATENT DOCUMENTS

| | | |
|---|---|---|
| 60-220698 | 11/1985 | Japan . |
| 63-74399 | 4/1988 | Japan . |
| 0285799 | 1/1990 | Japan ................. 381/71 |
| 2-70195 | 3/1990 | Japan . |
| 0070152 | 3/1990 | Japan ................. 381/71 |
| 2-94999 | 4/1990 | Japan . |
| 2-252399 | 10/1990 | Japan . |
| 3-42999 | 2/1991 | Japan . |
| 0067740 | 3/1991 | Japan ................. 381/71 |

OTHER PUBLICATIONS

"Audible Noise Suppression", IBM Technical Disclosure Bulletin, vol. 31, No. 8, Jan. 89, pp. 256–258.

*Primary Examiner*—Curtis Kuntz
*Assistant Examiner*—Ping W. Lee
*Attorney, Agent, or Firm*—Wolf, Greenfield & Sacks, P.C.

[57] ABSTRACT

A silencing apparatus for effectively reducing noises in the three dimension space which detects physical characteristics of the noise source by the laser doppler sensor unit during the noise source comes close to the telephone booth, and collects acoustic characteristics of the noise source by the sensor microphone array. The control portion generates an inverse-phased signal against the noise source so that the noises are decreased at the error sensor, and stores the noise source information (physical characteristics and the acoustic characteristics) and the generated inverse-phased signal. When the same noise source come closely, the voice is generated from the speaker using the inverse-phased signal stored in the memory. The control potion generates an inverse-phased voice from the speaker when the collected noise by the sensor microphone is actually over a certain threshold level.

22 Claims, 9 Drawing Sheets

| No | Type of Train | Physical Characteristic | Acoustic Characteristic | Parameter File |
|---|---|---|---|---|
| 1 | Local Train 11 Vehicles | Speed 50Km/H Length 11 | S 1 | F 1 |
| 2 | Local Train 15 Vehicles | Speed 50Km/H Length 15 | S 2 | F 2 |
| 3 | Express Train 20 Vehicles | Speed 70Km/H Length 20 | S 3 | F 3 |
| 4 | Super Express Train 20 Vehicles (Passing) | Speed 100Km/H Length 20 | S 4 | F 4 |
| 5 | Freight Train | Speed 30Km/H Length Indefinite | S 5 | F 5 |
| 6 | Unknown Train | / | / | / |

FIG. 5

SILENCING APPARATUS

BACKGROUND OF THE INVENTION

1. Field of the Invention

The invention relates to an electronic silencing apparatus which reduces ambient noises in open space. This electronic silencing apparatus can be applied, for example, to a telephone set in a telephone booth at a station where many kinds of ambient noises are entering repeatedly.

2. Description of the Prior Art

FIG. 8 shows a conventional silencing apparatus for reducing the ambient noise described in the laid-open patent publication No. 2-252399 which is mounted in a telephone set for reducing the noise by electronic signal processing.

In the figure, 1 is a main body of the handset, 2 is a voice microphone, 3 is a noise microphone, 4 is a voice speaker, 5 is a voice receiving potion, 6 is an ear, 7 is an auris externa. 8 is a voice transmitting portion.

The operation of the present invention is described here. The voice microphone 2 collects the voice of the talker along with the ambient noises and transduces the acoustic signal to an electrical signal.

The noise microphone 3 collects the ambient noises and transduces the acoustic signal to an electrical signal, which is reversed in phase against the electrical signal transduced by the voice microphone, in the control circuit (not shown). These two electrical signals are added and transduced into an acoustic signal in which the ambient noises are reduced. Therefore, the voice reduced noise is outputted from the voice speaker 4. The conventional apparatus reduces the ambient noises which are passing through the auris externa 7 by eliminating the ambient noises from the received voice collected by the microphone 2.

Since the conventional silencing apparatus is constructed as described above, there is a problem that ambient noises which reach the talker's ears from the noise source except the speaker, for example, mobile noise source, cannot be reduced, although the noises generated by the speaker can be reduced.

That is, since the apparatus reduces the noise by processing the signal on the control circuit, the apparatus cannot reduce the noise transmitted in the ears of the talker through the air, although the noise included in the transmitted line can be reduced. Therefore, the talker receives ambient noises even if the noise of the speaker is reduced.

It is an object of the present invention to provide a silencing apparatus for reducing (1) an ambient noise where its position is not specified and (2) an ambient noise which is moving such as mobile noise source.

It is further object of the present invention to provide a silencing apparatus for reducing a noise within a broad area where the noise is appeared by means of collecting the noise.

SUMMARY OF THE INVENTION

A silencing apparatus of a first aspect of the present invention comprises a characteristics measuring means which comprises a sensor microphone array for measuring acoustic characteristics of the noise source and a laser doppler sensor unit for obtaining accurate physical characteristics (length, speed etc.) of the noise source. The silencing apparatus also comprises noise reduction means which comprises a computing portion for analyzing and controlling an inverse-phased acoustic signal against the noise source by processing the acoustic signal, a digital filter for generating an electrical signal wave in response to the inverse-phased acoustic signal outputted from the computing portion, a speaker for generating a voice having the inverse phase against the noise, and an error sensor for supervising a state of the voice generated from the speaker. By the above construction, the present silencing apparatus can reduce noises received from a three dimensional space.

A silencing apparatus of a second aspect of the present invention comprises a memory means for storing a noise reduction signal in advance according to the predetermined characteristics of the noise source; and a noise reduction signal generating means for generating a noise reduction signal corresponding to the signal stored in the memory means according to the characteristics of the noise source coming close.

A silencing apparatus of a third aspect of the present invention comprises a noise reduction means for reducing the noise in a certain space, noise measuring means for measuring noise of the space to be reduced by the noise reduction means, and a control means for selectively activating the noise reduction means according to the noise measured by the noise measuring means.

BRIEF DESCRIPTION OF THE DRAWINGS

FIG. 5 shows characteristics of an electric train according to a silencing apparatus of the invention.

DETAILED DESCRIPTION OF THE PREFERRED EMBODIMENTS

First embodiment

Figure 1:
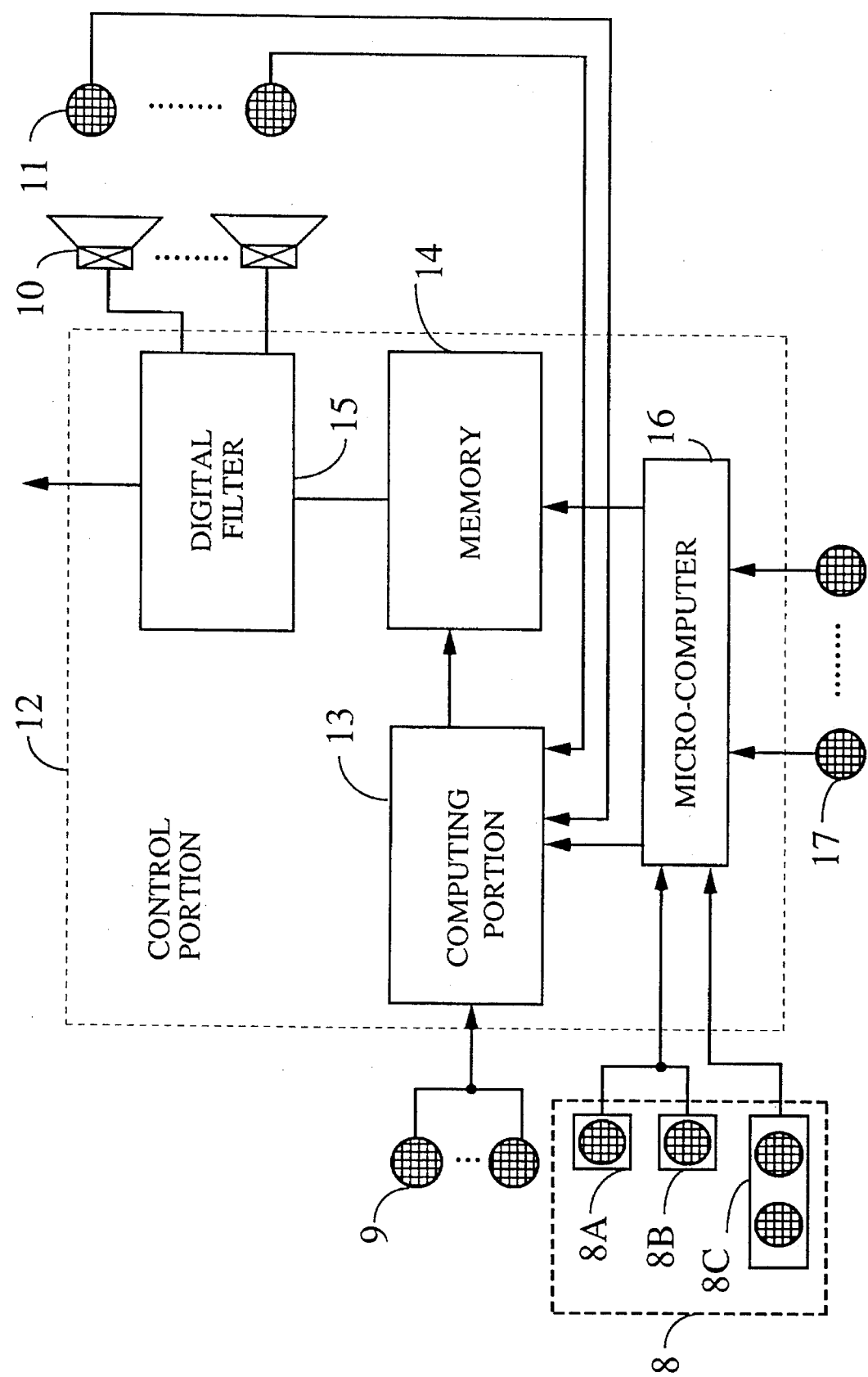
FIG. 1 is a block diagram of an active noise control system of an embodiment of the present invention.

FIG. 1 is a block diagram of an active noise control (ANC) system of an embodiment of the present invention.

Figure 2:
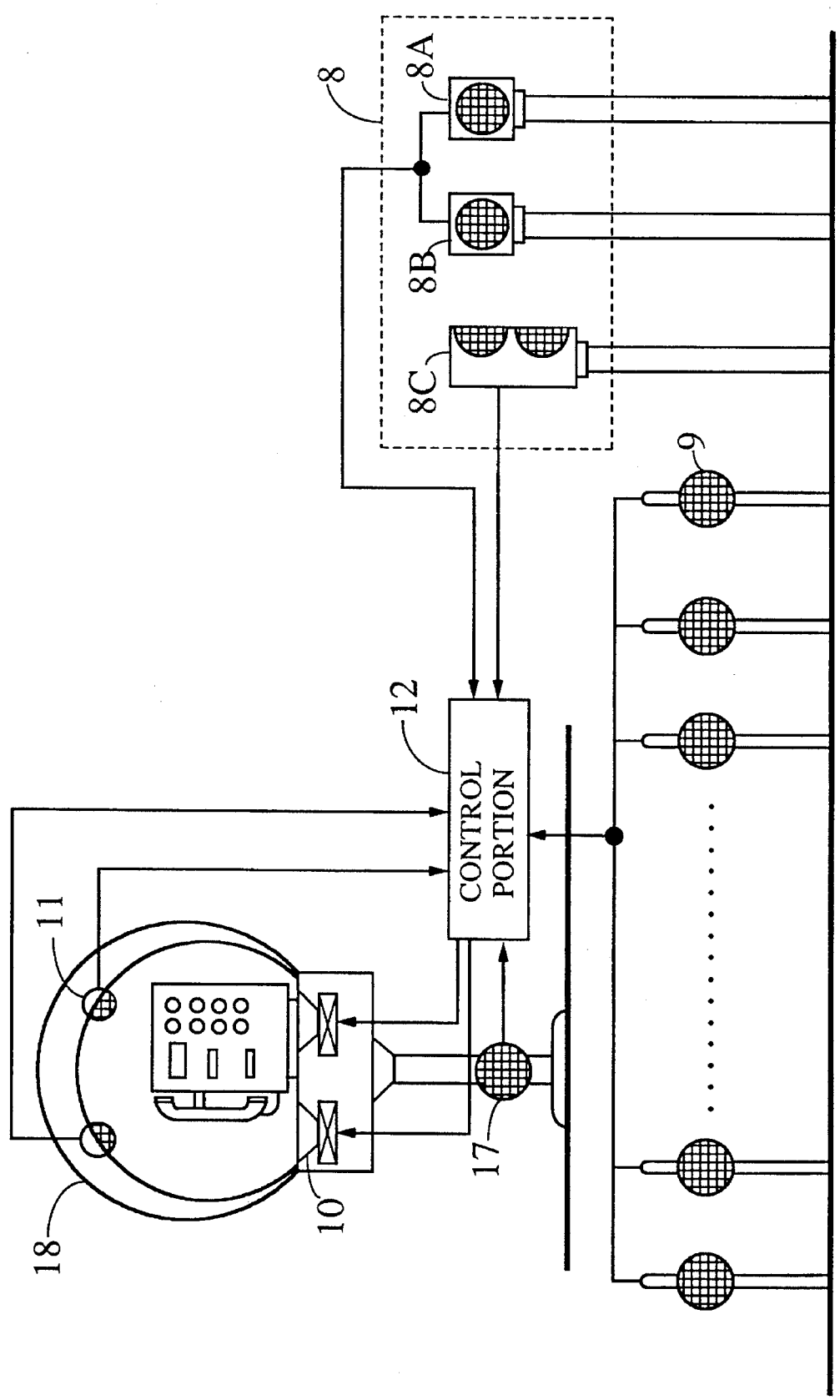
FIG. 2 is a noise control system applied to a telephone booth located on the platform of a railway station.

FIG. 2 is a noise control system applied to a telephone booth located on a platform of a railway station.

Figure 3:
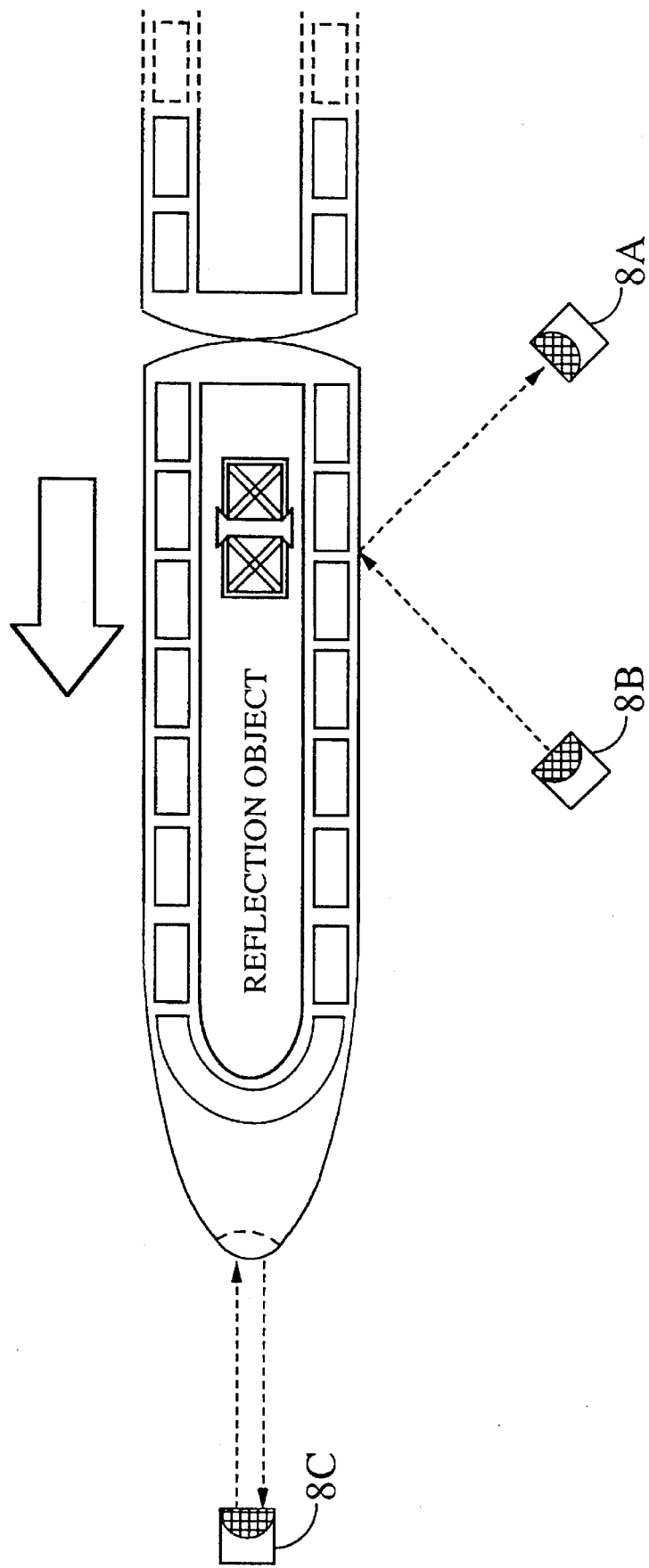
FIG. 3 is a block diagram of an active noise control system having a delay circuit of an embodiment of the present invention.

FIG. 3 is an allocation diagram of a laser doppler sensor unit for detecting the train speed and length.

In FIG. 1, FIG. 2 and FIG. 3, 8 shows a laser doppler unit for getting the information of the electric train. The laser doppler unit comprises three laser doppler sensors 8A, 8B and 8C. The laser doppler sensors 8A and 8B placed at the separated positions as shown in the figure detect the passing time of the electric train which generates the ambient noises.

The laser doppler sensor 8C detects the speed of the electric train. The length of the combination trains can be detected by the laser doppler sensors 8A, 8B and 8C. 9 are sensor microphone arrays comprised of a plurality of microphones in order to collect and measure acoustic characteristics (for example, acoustic pressure level) by real time processing while the moving electric train which generates the noise comes close and passes through the platform. A plurality of sensor microphones 9 are allocated along the rails as shown in FIG. 2, which are able to detect accurately the acoustic characteristics of the mobile vehicle such as an electric train. 10 are speakers for generating an inverse-phased voice against the acoustic noise source. 11 is an error sensor for measuring the ambient noises in the space to be eliminated and supervising a state of voice generated from the speaker 10. 12 is a control portion of the apparatus comprising a computing portion 13, a memory 14, a digital filter 15 and a micro-computer 16. 17 are sensor microphones for collecting the ambient noises which come close to the object space (telephone booth). 18 is a telephone booth where the ambient noises are to be reduced.

The computing portion 13 uses a LMS (Least Mean Square) algorithm in order to generate a voice having an inverse phase against the acoustic signal characteristics collected from the ambient noise source by the sensor microphone arrays for the voice source. The memory 14 records the computed result obtained by the computing portion 13 and parameters (physical characteristic, acoustic characteristics and so on) of the acoustic source. The digital filter 15 generates an actual inverse-phased signal according to the parameters of the inverse-phased acoustic signal processed by the computing portion 13. The micro-computer 16 controls the activation or inactivation of the ANC system in order to activate the ANC system when needed or not to activate the ANC system when not needed.

Figure 9:
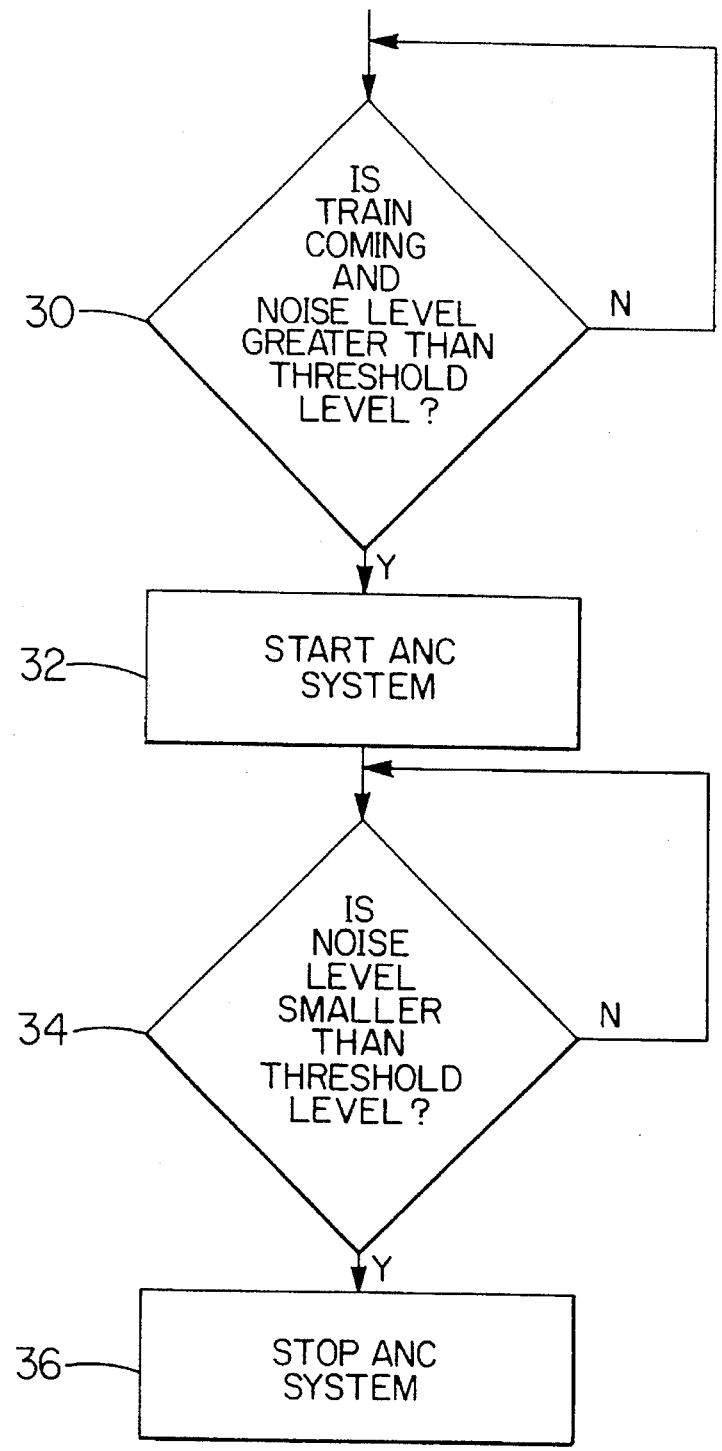
FIG. 9 is a flowchart illustrating starting and stopping of an ANC system according to the invention.

Referring also to FIG. 9, the ANC system is caused to start (step 32) when the laser doppler sensor unit 8 judges the electric train coming close or a passing through, and the ambient noise pressure level collected by the ambient noise sensor microphone 17 in the telephone booth 18 becomes greater than a certain threshold level (step 30). The ANC system is caused to stop (step 36) when the ambient noise pressure level collected by the ambient noise sensor microphone 17 in the telephone booth 18 becomes smaller than a certain threshold level after the ANC system has started (step 34).

The micro-computer 16 detects whether the coming electric train is unknown or already passing through by comparing the electric train information ( physical characteristics, speed and combination length and so on) collected from the laser doppler sensor unit 8 and the former electric train information stored in the memory 14. The micro-computer 16 judges whether the computing portion 13 has to compute newly the information or uses the resultant information ( parameters of the inverse-phased acoustic signal) already stored in the memory 14. Accordingly the micro-computer 16 can avoid the waste of computing time for computing the inverse-phased voice signal against the acoustic signal characteristics of the ambient noise source for every time the same electric train passes through the station.

Figure 4:
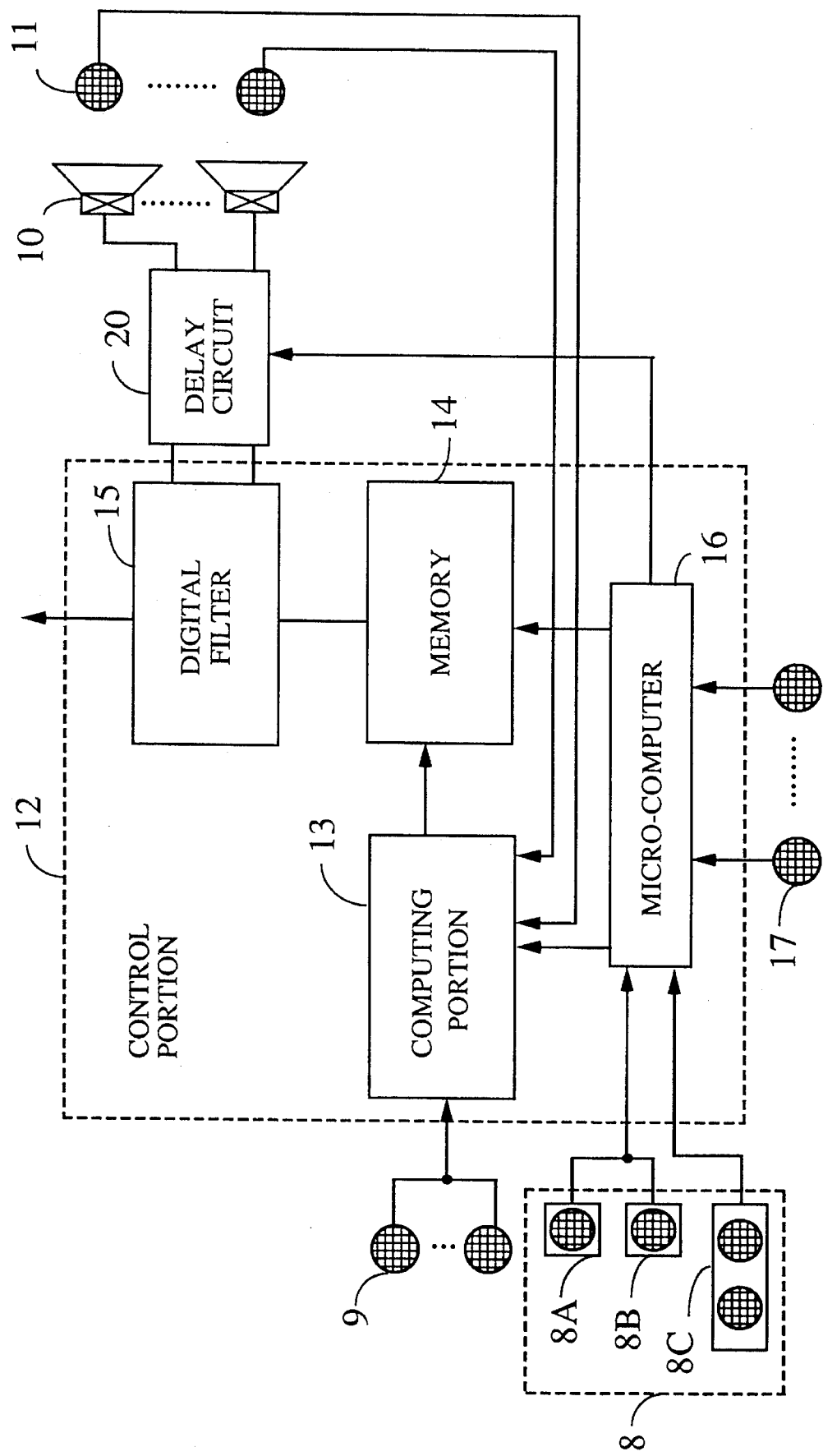
FIG. 4 is an allocation diagram of a laser doppler sensor unit.

FIG. 4 is a block diagram of another active noise control (ANC) system of an embodiment of the present invention. In FIG. 4, 20 is a delay circuit. In the figure, reference numerals are the same for like elements as those in FIG. 1. The delay circuit 20 delays the output signal from the lo digital filter 15 which is the inverse phase acoustic signal against the noise signal and outputted from the speaker 10 for eliminating the noise.

FIG. 5 shows the characteristics of an electric train according to a silencing apparatus of the present invention. In FIG. 5, five types of trains from No. 1 to No. 5 and an unknown train No. 6, which is different from the above five trains, are shown. For example, No. 1 train is combined with eleven vehicles and its speed is 50 Km/H. The speed is measured by the laser doppler sensor 8C and the length of the train is measured by the doppler sensors 8A and 8B. The laser doppler sensor 8A, for example, is mounted at the end of the platform of the station, and measures the speed of the train when the train comes into the station. The laser doppler sensors 8A and 8B decide how many vehicles the train has by the reflected signals from the vehicles. In the example of the present embodiment, since the local train referred as No. 1 has eleven vehicles, the length "11" is outputted from the doppler sensors 8A and 8B.

In a similar way, the local train having 15 vehicles referred to as No. 2 can be defined so that its speed is 50 Km/H and its length is 15. Regarding the express train referred to as No. 3, since the speed of the train is faster than the local train when it comes into the platform, for example, the speed of the train is defined as 70 Km/H by the doppler sensor 8C. In the case of the super express train referred to as No. 4, when the train does not stop at the station, the train passes through maintaining the speed of 100 Km/H. In the case of freight train referred to as No. 5, the train passes through without stopping at the station, for example, at a low speed of 30 Km/H. Regarding the freight train, since it has different length vehicles, the doppler sensors 8A and 8B detect each length of the vehicle.

A plurality of voice source sensor microphone arrays 9 arranged along the rails can collect or measure all noise while the train is coming close and going away. The control portion 12 stores the acoustic characteristics (from S1 to S5) collected by the voice source sensor microphone arrays 9 in the memory 14, respectively. The control portion 12 also stores the calculated parameters for noise reduction into the memory 14 as parameter files F1 to F5. The control portion 12 repeats the same operations every time the train comes close into the station. The parameter file is accumulated or averaged every time the train comes into the station. For example, when many local trains referred to as No. 1 each having eleven vehicles are coming into the station, the parameter file for the same local train will be revised more accurately. While a certain number of data are sampled, the parameters of the parameter files F1 to F5 are converged to desired values. When the train is coming close to the platform of the station, the apparatus of the present invention can recognize the type of train by the doppler sensor without processing the new calculation and can generate a noise reduction signal in response to the corresponding parameter files. For example, when the train coming close to the platform is recognized as an express train by the laser doppler sensor unit 8, the apparatus generates a noise reduction signal by using the parameters in the parameter file F3 which is stored in advance in the memory 14, without newly collecting the noise from the voice source sensor microphone array 9 in order to reduce the present noises received from the train.

As described above, the embodiment of the present invention comprises an acoustic sensor microphone for measuring acoustic characteristics of the noise source and a laser doppler sensor unit for measuring physical characteristics of the noise source in order to actively reduce the noise of the open space.

The embodiment of the present invention further comprises a memory for storing acoustic and physical information of the noise source and a signal for silencing apparatus generated by the digital signal processing in response to the acoustic and physical information.

The embodiment of the present invention further comprises a micro-computer. The micro-computer compares the incoming acoustic and physical information of the noise source with the stored acoustic and physical information of the noise source in advance, and selects whether the calculating portion newly calculates the noise reduction signal or the apparatus uses the noise reduction signal stored in advance in the memory.

The embodiment of the present invention further comprises an ambient noise sensor microphone for collecting ambient noises of the space where the noises are to be reduced, and a controlling micro-computer for controlling start and stop of the silencing apparatus using the collected ambient noises.

According to the silencing apparatus of the embodiment of the present invention, the physical characteristics of the noise source is accurately obtained by using the laser doppler sensor unit.

Further, according to the silencing apparatus of the embodiment of the present invention, the calculating portion does not need to generate a signal for reducing the noises against the repeatedly incoming noise by using the memory and the micro-computer. The apparatus can further extend the life time of the DSP and can shorten the processing time for the apparatus. The resultant inverse-phased noise reduction signal can be generated instantly from the speaker.

Further, according to the silencing apparatus of the embodiment of the present invention, since the apparatus comprises ambient noise sensor microphones, the apparatus can only operates as needed without always being operating. As a result, the apparatus can extend its life time and reduce the power consumption.

Second embodiment

Figure 6:
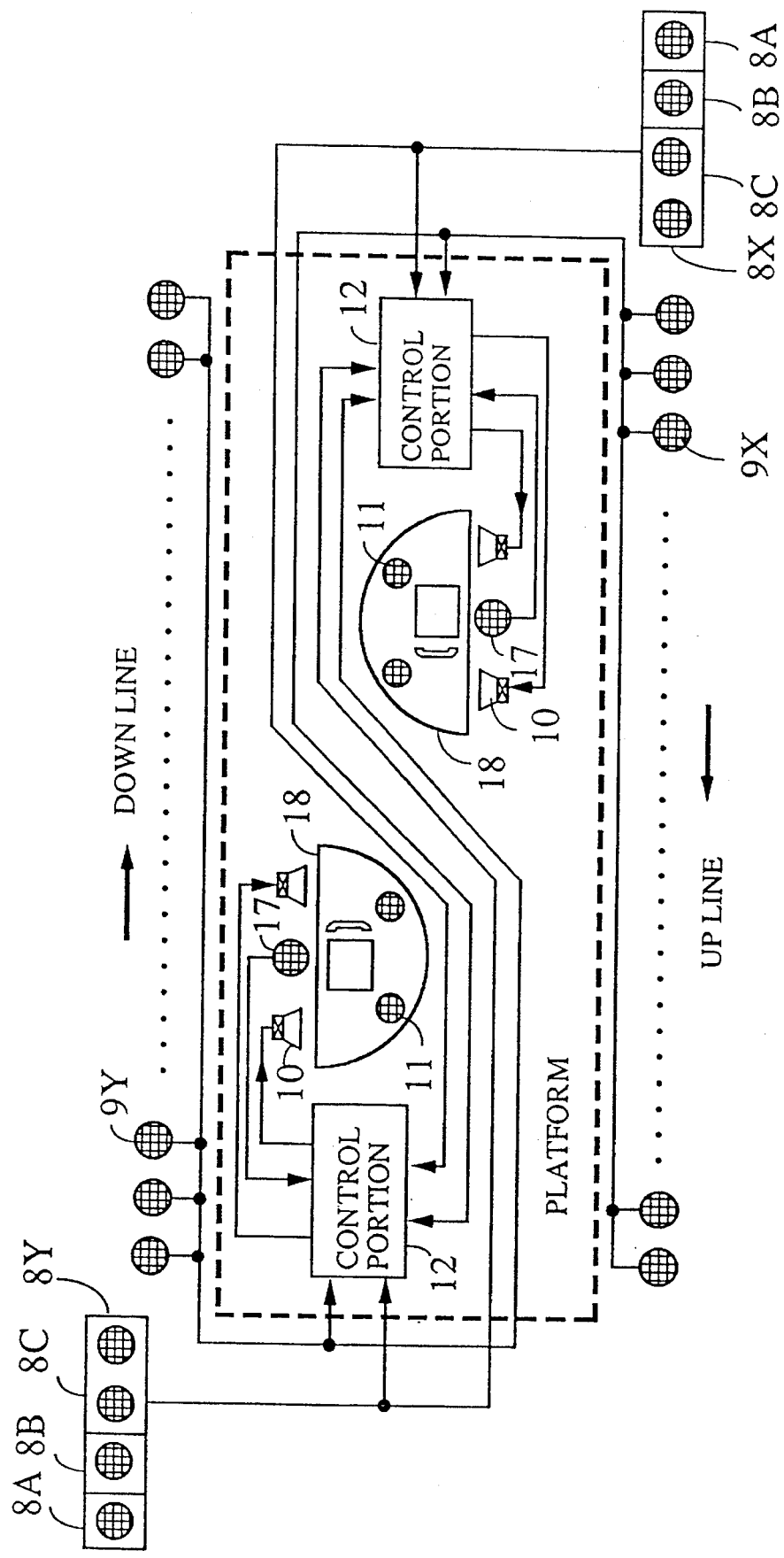
FIG. 6 is a block diagram of a silencing apparatus of another embodiment of the present invention applied to a telephone booth located at a station having rails at both sides of a platform.

FIG. 6 is a block diagram of a silencing apparatus of another embodiment of the present invention applied to a telephone booth located at a station having rails at both sides of a platform.

The embodiment of FIG. 6 is similar with that of FIG. 1, therefore, only a portions of the different constructions are explained here. The telephone booth where the noise is to be reduced receives noises from both the up train and down train. Therefore, the laser doppler sensor unit 8 comprises a laser doppler sensor unit 8X for the up train and a laser doppler sensor unit 8Y for the down train. By using two laser doppler sensor units 8X and 8Y, the silencing apparatus of the embodiment can accurately define the object for reducing the noise.

At the same time, the voice source sensor microphone array 9 also comprises a voice source sensor microphone array 9X for the up train and a voice source sensor microphone array 9Y for the down train in order to measure the acoustic characteristics of the train, that is, the noise source. By using two voice source sensor microphone arrays 9X and 9Y, the silencing apparatus of the embodiment can accurately collect a noise in order to generate a noise reduction signal.

The operation of the second embodiment is the same as that of the first embodiment, and thus the detailed explanation is omitted.

Third embodiment

Figure 7:
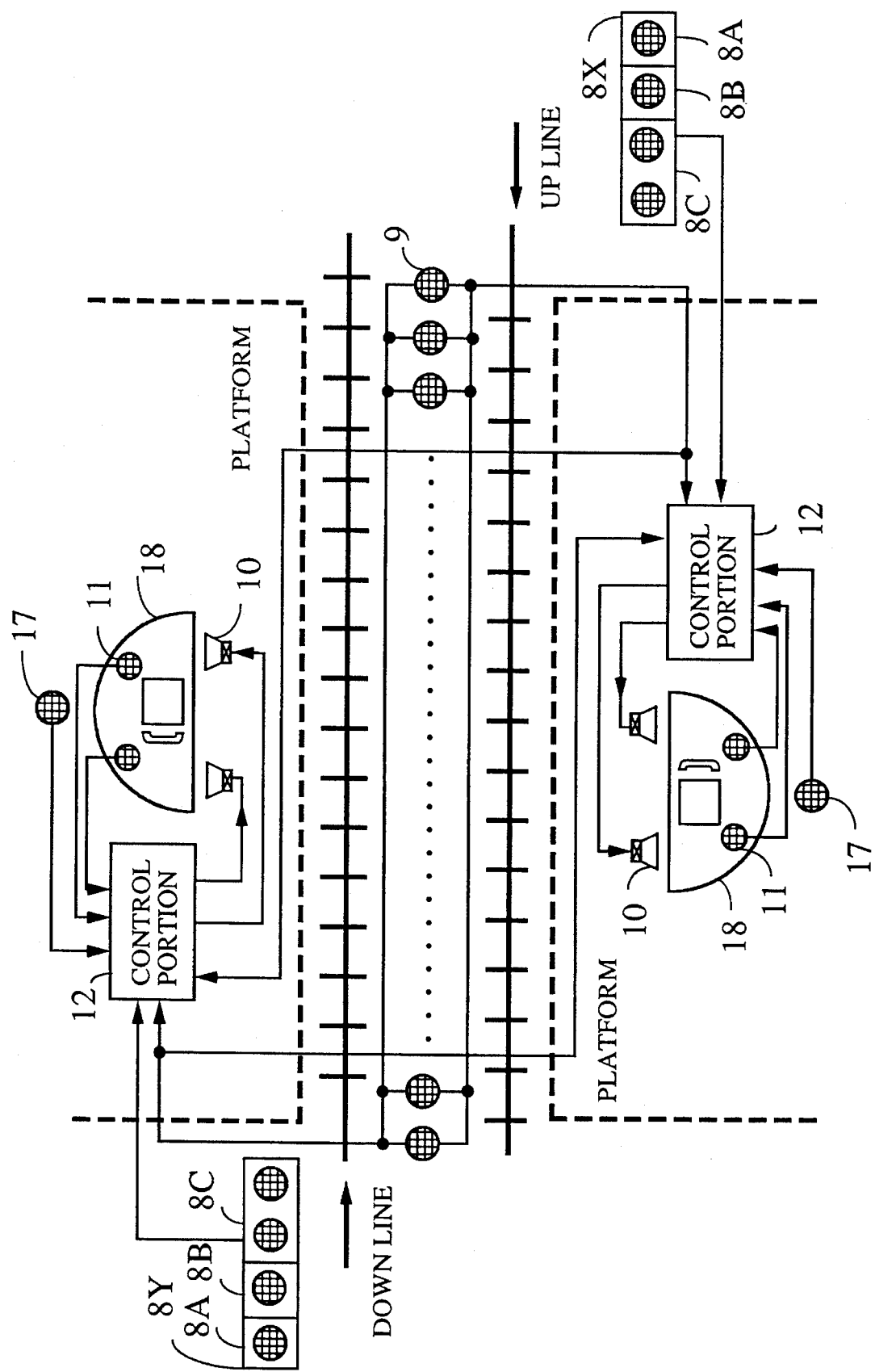
FIG. 7 is a block diagram of a silencing apparatus of another embodiment of the present invention applied to a telephone booth located at a station having platforms at both sides of rails.
Figure 8:
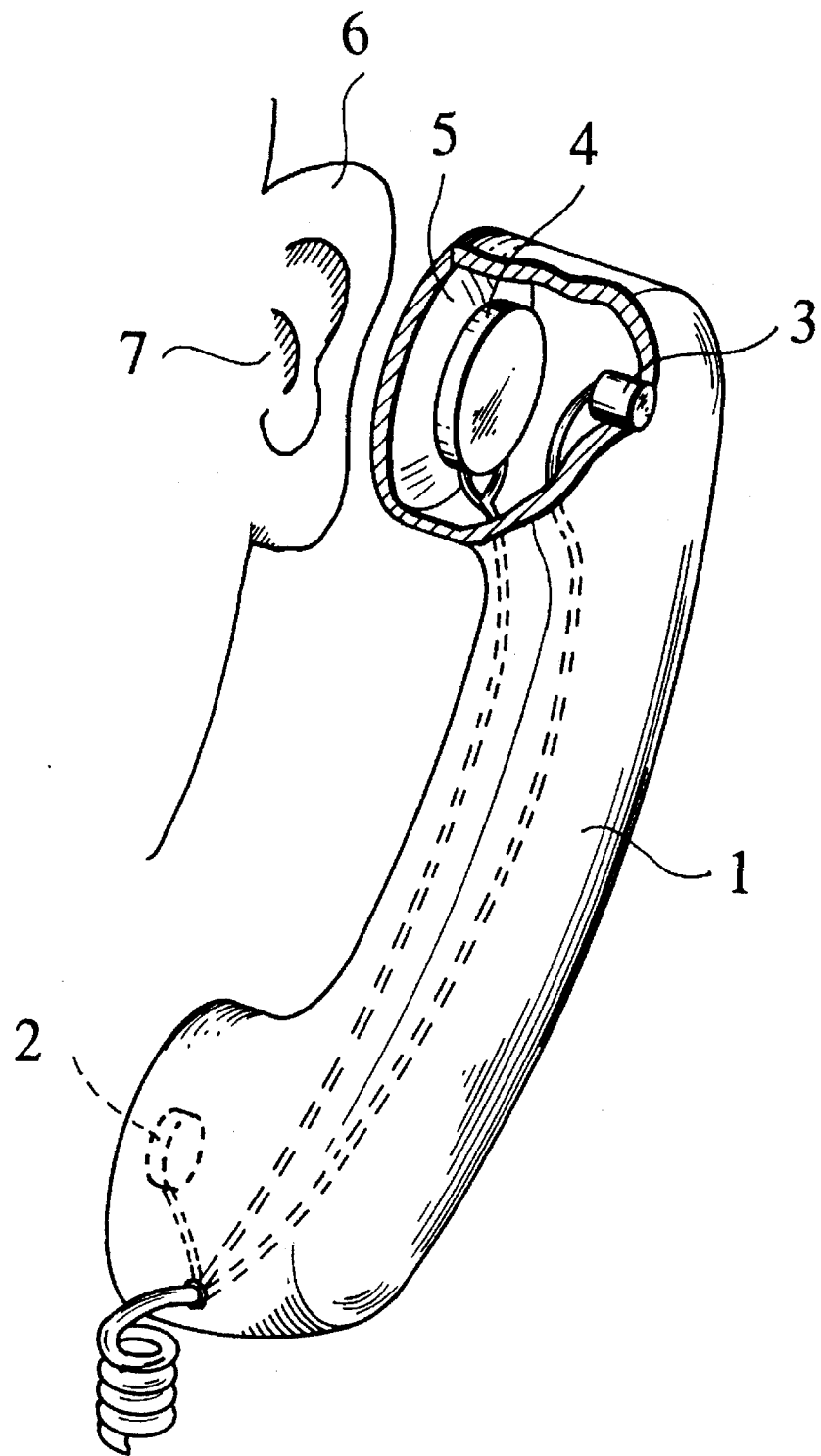
FIG. 8 shows a conventional silencing apparatus.

FIG. 7 is a block diagram of a silencing apparatus of other embodiment of the present invention applied to a telephone booth located at a station having platforms at both sides of rails. The embodiment of FIG. 7 is similar with that of FIG. 6, therefore, only portions of the different constructions are explained here.

In this case, since the telephone booth receives the noise only from the rail direction, the noises generated from both the up train and the down train are commonly collected by only one apparatus of voice source sensor microphone array 9.

The operation of the third embodiment is the same as that of the second embodiment, and thus the detailed explanation is omitted.

Fourth embodiment

In the above embodiments, although the telephone booth located especially at the train station is described, it may be located at the place such as a bus stop or a road side with the same noise reduction effect. This invention is also applied to an announcing speaker or a drive-through at a fast food.

In these embodiments, a laser doppler sensor which is one of the optical sensors is described. But, any other optical sensors can be used for detecting the physical characteristics of the noise sources.

In these embodiments, a microphone sensor which is one of the acousto-electric transducers is described. But, any other transducer such as a vibration pickup or an acceleration pickup can be used for detecting the acoustic characteristics of the noise sources.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

What is claimed is:

1. A silencing apparatus comprising:

microphone sensor arrays for measuring acoustic characteristics of the noise which is generated by an approaching one of a plurality of different noise sources, when said approaching one is moving toward the silencing apparatus;

optical sensor means for detecting physical characteristics of the approaching one of the noise sources as it is moving toward the silencing apparatus;

control means responsive to the optical sensor means for deciding which of a plurality of predetermined noise source types the approaching one of the noise sources belongs to, according to the physical characteristics detected by the optical sensor means; and noise reduction means responsive to the microphone sensor arrays, to the optical sensor means, and to the control means, for outputting a noise reduction signal which reduces the noise according to the type of the noise source as determined by the control means according to the characteristics of the noise source detected by said optical sensor means.

2. A silencing apparatus according to claim 1, wherein said optical sensor means comprise a laser doppler sensor for detecting the physical characteristics of the approaching one of the noise sources.

3. A silencing apparatus according to claim 1, wherein said noise reduction means reduce the noise within a predetermined space in accordance with the acoustic characteristics and the physical characteristics of the approaching one of the noise sources.

4. A silencing apparatus according to claim 1, wherein said noise reduction means comprises:

memory means for storing at least one stored noise reduction signal in advance corresponding to at least one of the predetermined noise source types; and noise reduction signal generating means for generating a noise reduction signal corresponding to one of the at least one stored noise reduction signal retrieved from the memory means in response to a decision by the control means according to the physical characteristics of the approaching one of the noise sources detected by said optical sensor means.

5. A silencing apparatus according to claim 1, wherein a portion of the noise reaches the apparatus, and further comprising a delay circuit which delays the noise reduction signal for a predetermined time according to the duration of the noise travelling from the approaching one of the noise sources to the apparatus.

6. The apparatus of claim 1 wherein the physical characteristics detected by the optical sensor means include a speed of the approaching one of the noise sources.

7. The apparatus of claim 1 wherein the physical characteristics detected by the optical sensor means include a length of the approaching one of the noise sources.

8. The silencing apparatus of claim 1 wherein the plurality of noise source types includes an unknown noise source type.

9. A silencing apparatus comprising:

microphone sensor arrays for measuring acoustic characteristics of the noise which is generated by an approaching one of a plurality of different noise sources, when said approaching one is moving toward the silencing apparatus;

an optical sensor for detecting physical characteristics of the approaching one of the noise sources as it is moving toward the silencing apparatus;

a controller responsive to the optical sensor for deciding which of a plurality of predetermined noise source types the approaching one of the noise sources belongs to, according to the physical characteristics detected by the optical sensor; and a noise reduction signal generator responsive to the microphone sensor arrays, to the optical sensor, and to the controller, for outputting a noise reduction signal which reduces the noise according to the type of the noise source as determined by the controller according to the characteristics of the noise source detected by said optical sensor.

10. A silencing apparatus according to claim 9, wherein said optical sensor comprises a laser doppler sensor unit for detecting the physical characteristics of the approaching one of the noise sources.

11. A silencing apparatus according to claim 9, wherein said noise reduction signal generator is for reducing the noise within a predetermined space in accordance with the acoustic characteristics and the physical characteristics of the approaching one of the noise sources.

12. A silencing apparatus according to claim 9, wherein said noise reduction signal generator comprises:

memory for storing at least one stored noise reduction signal in advance corresponding to at least one of the predetermined noise source types; and noise reduction signal generating apparatus for generating a noise reduction signal corresponding to one of the at least one stored noise reduction signal retrieved from the memory in response to a decision by the controller according to the physical characteristics of the approaching one of the noise sources detected by said optical sensor.

13. A silencing apparatus according to claim 9, further comprising a delay circuit which delays the noise reduction signal for a predetermined time according to the duration of the noise travelling from the approaching one of the noise sources to the apparatus.

14. The apparatus of claim 9 wherein the physical characteristics detected by the optical sensor include a speed of the approaching one of the noise sources.

15. The apparatus of claim 9 wherein the physical characteristics detected by the optical sensor include a length of the approaching one of the noise sources.

16. The silencing apparatus of claim 9 wherein the plurality of noise source types includes an unknown noise source type.

17. A silencing apparatus, comprising:

a sensor for detecting physical characteristics of a vehicle that is sufficiently close to a telephone that noise produced by the vehicle is loud enough to be heard at the telephone;

a controller responsive to the sensor for deciding which of a plurality of predetermined vehicle types the vehicle belongs to, according to the physical characteristics detected by the sensor;

a noise reduction signal generator responsive to said sensor and to said controller for providing a noise reduction signal which reduces the noise produced by the vehicle at the telephone according to the type of the vehicle as determined by the controller according to the characteristics of the vehicle detected by said sensor; and wherein said sensor comprises an optical sensor and said optical sensor comprises a doppler laser unit that detects the passing time, the speed and the length of said vehicle.

18. A silencing apparatus, comprising:

a sensor for detecting physical characteristics of a vehicle that is sufficiently close to a telephone that noise produced by the vehicle is loud enough to be heard at the telephone;

a controller responsive to the sensor for deciding which of a plurality of predetermined vehicle types the vehicle belongs to, according to the physical characteristics detected by the sensor;

a noise reduction signal generator responsive to said sensor and to said controller for providing a noise reduction signal which reduces the noise produced by the vehicle at the telephone according to the type of the vehicle as determined by the controller according to the characteristics of the vehicle detected by said sensor;

further including an acoustic sensor for measuring acoustic characteristics of the vehicle, and wherein said noise reduction signal generator reduces the noise produced by the vehicle according to the acoustic characteristics measured by said acoustic sensor; and further including a noise sensor placed proximate to the telephone for measuring ambient noises proximate the telephone, and wherein said noise reduction signal generator reduces the noise produced by the vehicle according to the measured ambient noises measured by said noise sensor.

19. A silencing apparatus, comprising:

a sensor for detecting the presence of a vehicle that is sufficiently close to a telephone that noise produced by the vehicle is loud enough to be heard at the telephone, a noise reduction signal generator responsive to said sensor for providing a noise reduction signal which reduces the noise produced at the telephone by the vehicle if the presence of the vehicle is detected by said sensor, control circuitry for selectively activating and deactivating said noise reduction signal generator according to the noise measured by a noise sensor, wherein deactivating said noise reduction signal generator causes said noise reduction signal generator to cease generating any noise reduction signals, and wherein said sensor comprises an optical sensor and wherein said optical sensor comprises a doppler laser unit that detects the passing time, the speed and the length of said vehicle.

20. A silencing apparatus, comprising:

a sensor for detecting the presence of a vehicle that is sufficiently close to a telephone that noise produced by the vehicle is loud enough to be heard at the telephone, a noise reduction signal generator responsive to said sensor for providing a noise reduction signal which reduces the noise produced at the telephone by the vehicle if the presence of the vehicle is detected by said sensor, control circuitry for selectively activating and deactivating said noise reduction signal generator according to the noise measured by a noise sensor, wherein deactivating said noise reduction signal generator causes said noise reduction signal generator to cease generating any noise reduction signals, further including an acoustic sensor for measuring acoustic characteristics of the vehicle, and wherein said noise reduction signal generator reduces the noise produced by the vehicle according to the acoustic characteristics measured by said acoustic sensor, and further including a second noise sensor placed proximate to the telephone for measuring ambient noises proximate the telephone, and wherein said noise reduction signal generator reduces the noise produced by the vehicle according to the measured ambient noses measured by said second sensor.

21. A silencing apparatus, comprising:

a sensor for detecting physical characteristics of a vehicle that is sufficiently close to a telephone that noise produced by the vehicle can be heard at the telephone;

a controller responsive to the sensor for deciding which of a plurality of predetermined vehicle types the vehicle belongs to, according to the physical characteristics detected by the sensor;

a noise reduction signal generator responsive to said sensor and to said controller for providing a noise reduction signal which reduces the noise produced by the vehicle at the telephone according to the type of the vehicle as determined by the controller according to the characteristics of the vehicle detected by said sensor; and wherein the physical characteristics detected by the sensor include a length of the vehicle.

22. A silencing method, comprising:

measuring acoustic characteristics of noise which is generated by an approaching one of a plurality of different noise sources when said approaching one is moving toward the silencing apparatus;

detecting physical characteristics of the approaching one of the noise sources as it is moving toward the silencing apparatus;

deciding which of a plurality of predetermined noise source types the one of the noise sources belongs to, according to the physical characteristics detected by the step of detecting;

providing a noise reduction signal which reduces noises according to the type of the noise source as determined by the step of deciding and according to the step of measuring; and wherein the step of detecting physical characteristics of the approaching one of the noise sources includes detecting a length of the approaching one of the noise sources.

* * * * *